United States Patent
Olsen et al.

(10) Patent No.: US 11,715,023 B2
(45) Date of Patent: Aug. 1, 2023

(54) METHODS AND APPARATUSES FOR TRAINING ONE OR MORE MODEL PARAMETERS OF A PREDICTIVE PARKING DIFFICULTY MODEL

(71) Applicant: Bayerische Motoren Werke Aktiengesellschaft, Munich (DE)

(72) Inventors: Jesper Olsen, Chicago, IL (US); Won Tchoi, Barrington, IL (US); Jilei Tian, Chicago, IL (US)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 467 days.

(21) Appl. No.: 16/934,047

(22) Filed: Jul. 21, 2020

(65) Prior Publication Data
US 2022/0027747 A1 Jan. 27, 2022

(51) Int. Cl.
*G06N 5/04* (2023.01)
*G06N 20/00* (2019.01)

(52) U.S. Cl.
CPC .............. *G06N 5/04* (2013.01); *G06N 20/00* (2019.01)

(58) Field of Classification Search
CPC .......... G06N 5/04; G06N 5/003; G06N 20/00; G06N 20/20; G06N 20/10
See application file for complete search history.

(56) References Cited

U.S. PATENT DOCUMENTS

| | | | |
|---|---|---|---|
| 2020/0201915 A1* | 6/2020 | Pathak | G06N 3/084 |
| 2021/0133603 A1* | 5/2021 | Zhu | G06N 5/04 |
| 2021/0191407 A1* | 6/2021 | Benisch | G05D 1/0219 |

OTHER PUBLICATIONS

Nandugudi, "PocketParker: Pocketsourcing Parking Lot Availability", UBICOMP '14, Sep. 13-17, 2014, Seattle, WA, USA. (Year: 2014).*
Tie-Yan Liu: Learning to Rank for Information Retrieval; Foundations and Trends in Information Retrieval; vol. 3, No. 3 (2009) 225-331.
Neha Arora et al.: Hard to Park? Estimating Parking Difficulty at Scale; Applied Data Science Track Paper; KDD'19, Aug. 4-8, 2019, Anchorage, AK, USA.

* cited by examiner

*Primary Examiner* — Dave Misir
(74) *Attorney, Agent, or Firm* — 2SPL Patent Attorneys PartG mbB; Yong Beom Hwang (57) ABSTRACT

The present disclosure relates to a concept for training one or more model parameters of a predictive parking difficulty model for different locations based on collected telemetry data. A ground truth ranking related to subjective parking difficulties at the different locations is obtained based on pairwise comparison of parking difficulties between pairs of the different locations by one or more humans. A prediction loss between a model ranking of the different locations obtained by the predictive parking difficulty model and the ground truth ranking is determined. The one or more model parameters are adjusted to minimize the prediction loss between the model ranking and the ground truth ranking.

8 Claims, 5 Drawing Sheets

METHODS AND APPARATUSES FOR TRAINING ONE OR MORE MODEL PARAMETERS OF A PREDICTIVE PARKING DIFFICULTY MODEL

FIELD

The present disclosure generally relates to methods and apparatuses for informing a user or driver how hard it is to park a vehicle at a given destination and, more specifically, to present methods and apparatuses for training one or more model parameters of a computer-implemented predictive parking difficulty model for different locations which is based on collected telemetry data with improved annotation quality from limited human labeling.

BACKGROUND

Parking is one of the most important factors affecting the driving experience. Due to congestion, parking is becoming more and more difficult in many places across the globe. Drivers spend considerable time searching for parking, resulting in a significant annual cost per driver in wasted time, fuel, and emissions. This wasted time tends to be particularly stressful, so its impact on well-being may be disproportionate. Parking woes are not limited to travel or leisure activities. Parking problems may also arise at home or at work.

Many known approaches for parking services are about smart pricing policy, hardware sensor technology for vacancy detection, flow management, etc. For example, a price for parking can be adapted according to the demand, e.g. weekend price, early bird price, to optimize business value and consumer experience. Sensor technology, such as cameras, GPS and/or Bluetooth technology, can help to detect parking availability and share the information in real time via the Internet, for example. Sensor technology can suggest unoccupied parking slots available, but it may not predict a parking difficulty at the respective location directly. The most of parking difficulty modeling require high quality annotation to have very large coverage, data density and high-quality annotation from humans that is very costly and hard to access.

Due to POI (point of interest) location accuracy, ambiguous instructions and traffic signs, road complexity and facility capacity, there are some destinations where it is difficult or hard to park. If such locations can be identified, it may improve the driving experience. Thus, it is desirable to have a low-cost data driven approach where machine learning algorithms can be applied to improve this challenge. The quality of such approaches may depend on the ground truth data used for training the machine learning models.

SUMMARY

The present disclosure considers the problem of estimating the difficulty of parking at a particular location (and time). This problem may be a critical sub-component for any system providing parking assistance to users.

According to a first aspect of the present disclosure, it is provided a method for training one or more model parameters to optimize the performance of predictive parking difficulty model. The predictive parking difficulty model provides a parking difficulty (model) ranking for different location based on collected telemetry data in connection with these locations. The model parameters (e.g., computational weights) may be trained based on ground truth data. For this purpose, the method includes obtaining a ground truth ranking related to subjective parking difficulties at the different locations. According to the present disclosure, obtaining the ground truth ranking comprises a subjective pairwise comparison of parking difficulties between pairs of the different locations by one or more human users (crowd-sourcing). This is due to the limitation from human annotation. Firstly, nobody is able to know the parking difficulty for every location. It is also hard for humans to give consistent scoring for each of location and getting even harder when having the scores consistent among several users. As known, humans are capable of giving reasonable quality of comparison for the limited locations they knew. By combining those subjective comparisons from more humans, it leads to have high quality of annotation for the labelled locations, that can naturally optimize the predictive model then extend to the locations without labelling. The method further includes determining a prediction loss (loss function) between the model ranking of the different locations obtained by the predictive parking difficulty model and the ground truth ranking obtained by pairwise comparison. The method includes adjusting the one or more model parameters so as to minimize the prediction loss between the model ranking and the ground truth ranking.

In some embodiments, determining the prediction loss may comprises weighting locations with higher parking difficulty more than locations with lower parking difficulty since locations with higher parking difficulty may be more critical in terms of user experience and information value.

In some embodiments, determining the prediction loss may comprise computing the prediction loss QS according to $$QS = |r_1 - \hat{r}_1| + \sum_{i=2}^{N} \frac{|r_i - \hat{r}_i|}{\log_2(r_i)}$$

wherein $r_i$ denotes a ground truth ranking of the i-th location, $\hat{r}_i$ denotes a model ranking of the i-th location, and $|.|$ denotes the absolute difference. The skilled person having benefit from the present disclosure will appreciate that the weight/penalty can be different depending on the task and experiment. $\log_2(r_i)$ may be regarded as an example to illustrate the principle of applying unequal weight for the loss.

In some embodiments, the method may further comprise collecting, from a plurality of users, telemetry data (e.g., GPS data, time, etc.) during parking for each of the different locations, and converting respective telemetry data for the different locations to a respective score and/or model rank indicating a respective location's parking difficulty. In some embodiments, collecting telemetry data for each of the different locations may include measuring a user's walking distance from a parking location to a final destination.

In some embodiments, converting the telemetry data to the model rank for a respective location may involve the median, the mean, the variance of the telemetry data for the respective location across all users, and may involve the one or more model parameters of the predictive parking difficulty model. In some embodiments, the model rank for the respective location may be computed based on $$\text{Score} = \text{Median}^*(1 + \theta^* SK), \quad SK = \frac{\text{Median} - \text{Mean}}{\text{Var}},$$

wherein θ is a model parameter of the predictive parking difficulty model. The skilled person having benefit from the present disclosure will appreciate that other scores may be feasible as well.

In some embodiments, the method may further include generating a sorted list of model rankings and corresponding locations. This may be done based on the (parking) scores for the different locations.

In some embodiments, the predictive parking difficulty model may be implemented by a (supervised) machine learning model mapping one or more parking-related features extracted from the collected telemetry data to the model ranking of the for different locations.

In some embodiments, the pairwise comparison of parking difficulty may include setting ground truth ranking $r_i$ larger than ground truth ranking $r_j$ of any location pair i, j, if the subjective parking difficulty of location i is ranked higher than of location j by the one or more (human) users and generating a sorted list of ground truth rankings and corresponding locations.

In some embodiments, the method may further include using the predictive parking difficulty model with the adjusted model parameters for predicting a parking difficulty at a potential target location. For example, the predictive parking difficulty model may be implemented in a navigational system of a vehicle or a portable device, such as a smartphone.

According to a further aspect of the present disclosure, it is provided an apparatus for training one or more model parameters of a predictive parking difficulty model for different locations based on collected telemetry data. The apparatus comprises circuitry which is configured to determine a ground truth ranking related to a subjective parking difficulty at the different locations. The ground truth ranking is based on a subjective pairwise comparison of parking difficulty between pairs of the different locations done by one or more humans (users). The circuitry is configured to determine a prediction loss between a model ranking of the different locations obtained by the predictive parking difficulty model and the ground truth ranking and to adjust the one or more model parameters to minimize the prediction loss between the model ranking and the ground truth ranking.

In some embodiments, the circuitry may comprise machine learning circuitry based on supervised machine learning or circuitry implementing a predictive regression model.

Embodiments of the present disclosure propose using crowdsourcing data collected from a plurality of users to obtain a ground truth ranking from pairwise comparisons. This may improve the cost and quality of annotation while still keeping finer level scoring as target.

BRIEF DESCRIPTION OF THE FIGURES

Some examples of apparatuses and/or methods will be described in the following by way of example only, and with reference to the accompanying figures, in which FIG. 1 schematically shows a predictive parking difficulty model in accordance with the present disclosure.

DETAILED DESCRIPTION

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "in-eluding", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

Figure 1:
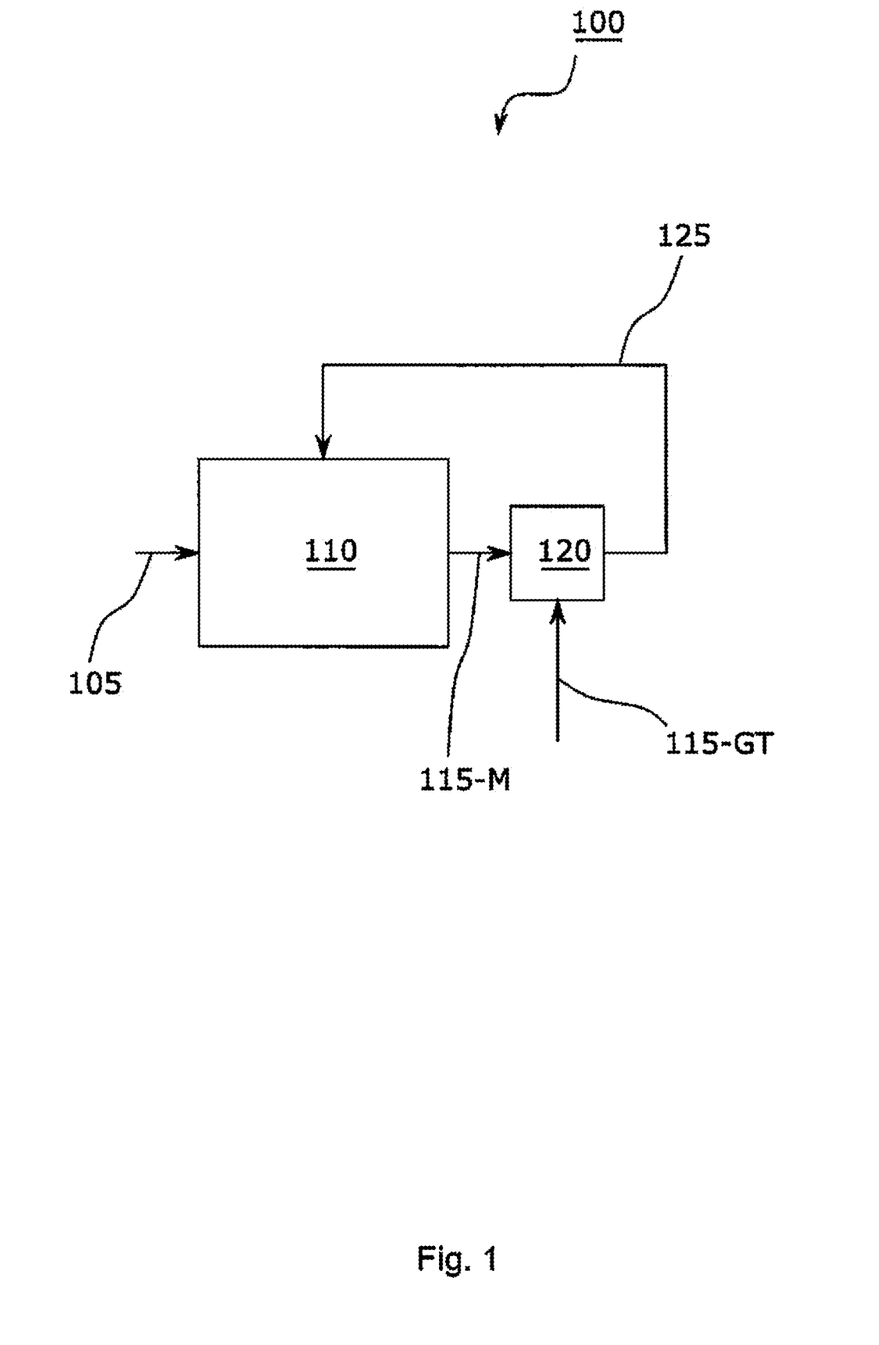

FIG. 1 schematically shows a predictive parking difficulty model 100 in accordance with the present disclosure.

In some embodiments, the predictive parking difficulty model 100 may be a predictive regression model. In other implementations, the predictive parking difficulty model 100 may be a computational more complex supervised machine learning model, for example. The skilled person having benefit from the present disclosure will appreciate that the specific implementation of the predictive parking difficulty model 100 is not important to understand the principles proposed herein.

Input 105 to the predictive parking difficulty model 100 may be (parking-related) features of different locations. The different locations may be POIs, addresses, or geographic areas as potential destinations for a driver. Thus, the different locations may be desired parking locations. The parking-related features, such as e.g., walking distances from parking to final destination, searching durations, etc., associated with the different locations may be extracted from context (e.g. time of day, day of week, etc.), respective telemetry data (e.g., GPS data, time, etc.) related to the different locations or data derived from the telemetry data. Examples for parking-related features may be distance and time spent circling the destination and/or distance from parking location to the final destination for a given context (e.g. time of day, day of week, etc.), distance to work and home, date, time, average and variance of parking score of the destination, familiarity index, etc. There may be more than one parking-related feature, i.e., feature=($f_1, f_2, \ldots, f_n$). The telemetry data and hence the parking-related features may be obtained from a plurality of users visiting the different locations at different times (crowdsourcing).

At its output, the predictive parking difficulty model 100 provides a parking difficulty model ranking 115-M for the different locations. This means that predictive parking difficulty model 100 may be configured to compute a parking score for each of the locations based on the input parking-related features 105. The respective parking score may indicate whether a certain location is considered hard-to-park. The parking difficulty model ranking 115-M may provide an intuitive sorted list of the different locations in accordance with the respective parking scores. For example, the location having the highest parking score (=hardest-to-park) may by listed first. In another example, the location having the lowest parking score (=easiest-to-park) may by listed first.

The parking difficulty model ranking 115-M from predictive parking difficulty model 100 and a ground truth ranking 115-GT are input to computation block 120 for computing a prediction loss 125 between the model ranking 115-M and the ground truth ranking 115-GT. The prediction loss 125 can be used to adjust/train the model parameters of predictive parking difficulty model 100. The model parameters/weights may be adjusted to minimize the prediction loss 125 between model ranking 115-M and ground truth ranking 115-GT. In this case, the results of the predictive parking difficulty model 100 best match the underlying ground truth.

According to the present disclosure, ground truth ranking 115-GT may be based on a subjective pairwise comparison of parking difficulties between pairs of the different locations. The subjective comparison is done by one or preferably by more human users (crowdsourcing). Crowdsourcing is a sourcing model in which individuals or organizations may obtain voting (pairwise comparison of parking difficulties) from a large, relatively open and often rapidly evolving group of participants. Currently, crowdsourcing typically involves using the Internet to attract and divide work between participants to achieve a cumulative result. From a machine learning point of view, learning by pairwise comparison is especially appealing as it decomposes a possibly complex prediction problem into a certain number of learning problems of the simplest type, namely binary classification.

In the following, the principles of the present disclosure will be detailed by looking at an exemplary parking-related feature "Distance from Parking Location to Destination" used as input 105 to predictive parking difficulty model 100. If a location is hard-to-park, a user may not able to drive directly to the final destination by the shortest route, as the user needs to take more time and drive to find the parking. Further, the user may not find a parking next to the desired final destination, so user needs to walk some distance to the final destination from a parking location. Thus, the feature "Distance from Parking Location to Destination" may be an adequate indicator of whether a location is hard-to-park or not.

Figure 2:
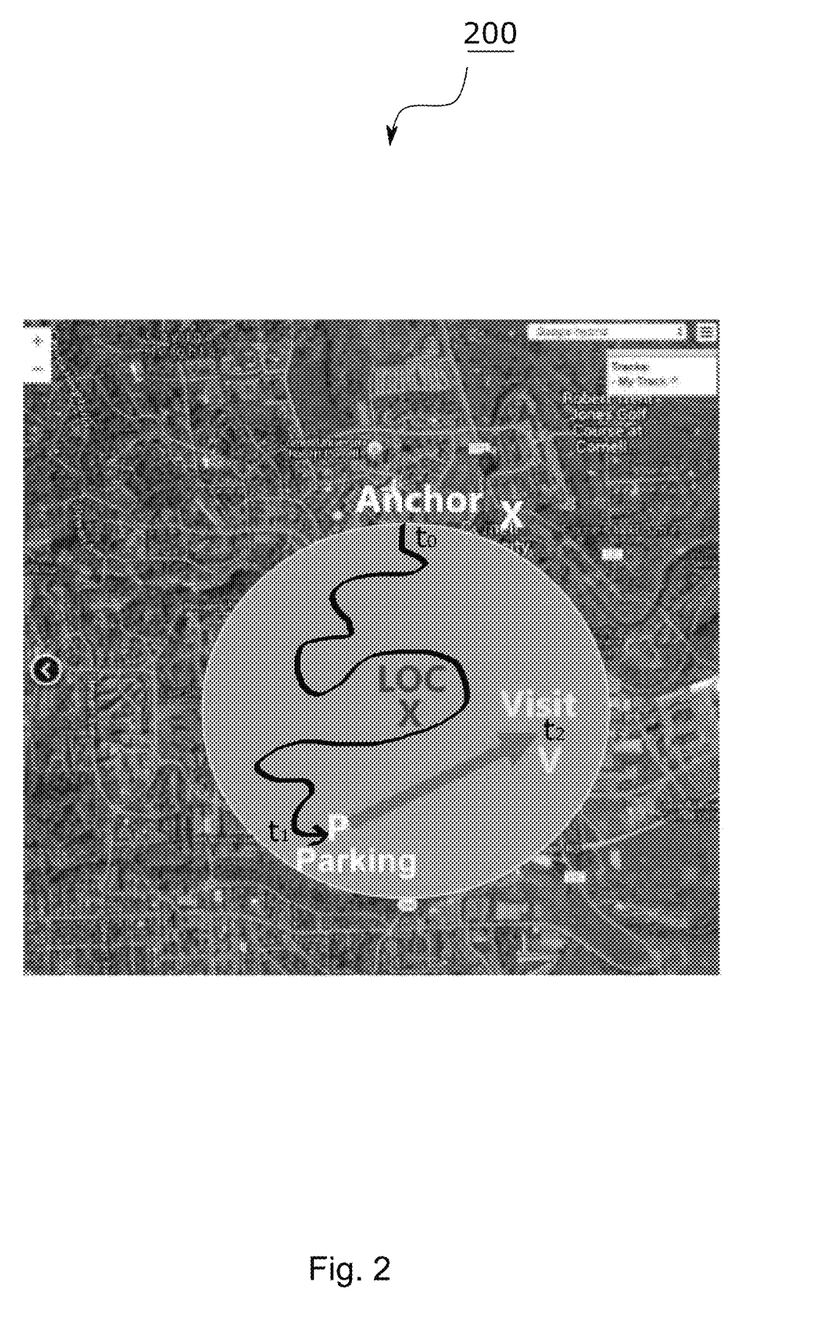
FIG. 2 shows a parking situation in geographical area X.

FIG. 2 shows a typical parking mobility sequence for parking at a geographical location or zone X.

A user enters area X at time $t_0$ and find a parking space P at time $t_1$. Thus, the time searching for parking is $t_1-t_0$. From $t_0$ to $t_1$, driver may drive a longer distance than the shortest route, which may also indicate the parking difficulty as driver may look for the parking, thus drive more distance than it should be. Since the user's desired final destination is V, the user still needs to walk from parking location P to final destination V. This may take from parking time $t_1$ to arrival time $t_2$. For example, the walking distance from parking location P to final destination V can be determined via GPS location tracking. A possible criterion for this may be the average user's speed. If the user's average speed is for example less than 5 km/h, walking may be detected. Thus, for geographical zone X the feature "Distance from Parking Location to Destination" may be extracted from the user's telemetry data. This may be done for a plurality of users and for different geographical zones/locations.

TABLE 1

| Destinations | Drivers | #Trips | Median | Mean | Var | SK = (Mean − Median)/Var | Median × (1 + α × SK) | Median-SK Rank |
| --- | --- | --- | --- | --- | --- | --- | --- | --- |
| Woodfield Mall | 398 | 578 | 0.33 | 0.52 | 0.39 | 0.487 | 0.491 | 6 |
| Old Town | 52 | 68 | 0.81 | 1.01 | 0.8 | 0.250 | 1.013 | 1 |
| Navy Pier | 149 | 172 | 0.39 | 0.61 | 0.54 | 0.407 | 0.549 | 5 |
| Randolph Street | 203 | 258 | 0.55 | 0.96 | 0.83 | 0.494 | 0.822 | 2 |
| Arlington Hts | 22 | 37 | 0.39 | 1.07 | 1.25 | 0.544 | 0.602 | 4 |
| Schaumburg Costco | 132 | 159 | 0.58 | 0.9 | 0.97 | 0.330 | 0.771 | 3 |

Table 1 shows statistical data related to the feature "Distance from Parking Location to Destination" for a plurality of different example locations. For the example destination "Woodfield Mall", the feature "Distance from Parking Location to Destination" was determined based on telemetry data from 578 trips of 398 different drivers. The median of the feature "Distance from Parking Location to Destination" here was 0.33, the mean was 0.52, and its variance was 0.39. For the destination "Old Town", the feature "Distance from Parking Location to Destination" was determined based on telemetry data from 68 trips of 52 different drivers. The median of the feature "Distance from Parking Location to Destination" here was 0.81, the mean was 1.01, and its variance was 0.8. It can be seen from the data that "Old Town" is harder to park than "Woodfield Mall". For the destination "Navy Pier", the feature "Distance from Parking Location to Destination" was determined based on telemetry data from 172 trips of 149 different drivers. The median of the feature "Distance from Parking Location to Destination" here was 0.39, the mean was 0.61, and its variance was 0.51. "Distance from Parking Location to Destination" data was also collected for additional locations "Randolph Street", "Arlington Hts" and "Schaumburg Costco".

In some embodiments, the median could be used as parking score. In this case, "Old Town" would be ranked hardest-to-park, while "Woodfield Mall" would be ranked easiest-to-park. The median is a value separating the higher half from the lower half of a data sample, a population or a probability distribution. In other embodiments, the mean could be used a parking score. For a data set, the arithmetic mean, also called the expected value or average, is the central value of a discrete set of numbers: specifically, the sum of the values divided by the number of values. In this case, "Arlington Hts" would be ranked hardest-to-park, while "Woodfield Mall" would be ranked easiest-to-park. It is proposed to use a normalized skewed score for predictive parking difficulty model 100 according to Score=Median*(1+θ*SK), with $$SK = \frac{\text{Median} - \text{Mean}}{\text{Var}}.$$

Thus, for each location, the feature "Distance from Parking Location to Destination" collected from multiple trips/users may be translated into a respective parking score via the above equations. The respective parking scores then yield a model ranking for the different locations.

For performance evaluation and model optimization, it is common to use annotation as "ground truth", that is, however, expensive to collect. To mitigate this, it is desirable to model without demand of large set of annotation, with a few parameters. Humans can annotate well for pairwise or pointwise rating, e.g. better/worse/same vs. ranking on long list or subjective scoring. With pairwise comparison and/or rating, it is possible to process them into a ground truth ranking for a given destination list but no scoring. It is fair to allow the same rank for different destinations.

According to some embodiments, the problem can be formulated as regression rather than classification task. Thus, the model can score the hard-to-park, thus give better recommendation and be a flexible enabler to be integrated for other use cases. An underlying assumption may be that the distribution of location as a long tail or power law distribution: (a). a few places are very hard-to-park, and (b). most places are moderate or easy to park. Therefore, an unequal weight for prediction loss computation may be used: hard-to-park locations (a) may be given more penalty than (b), as (a) is more critical in terms of user experience and information value, and (b) has a lots data but within small range of scores. Therefore, a "mis-order" of some of them has minor impact. If one place from (a) is mis-ranked, e.g. the first place, it must mis-rank the true first place or others in the lower rank, thus get higher penalty in the loss.

In the following, a reference implementation is provided. For better understanding of the principle, it is formulated in two steps, making the ground truth ranking 115-GT from pairwise comparison and optimizing the predictive parking difficulty model 100 by ranking evaluation.

In fact, the parking difficulty model ranking 115-M can be optimized directly from the pairwise comparison.

With pairwise comparison and/or rating, it is straightforward to process them into the ranking for a given destination list. It is fair to allow the same rank for different destinations. For any pair of items (locations) i and j, selected from item set I=[$i_1$, . . . , $i_N$], a user may compare their ranking as follows:

For the $k^{th}$ pair, we have ($p_k$: $r_i$>$r_j$) if item i is ranked higher than item j, where we have an evaluation pair set as P=[$p_1$, . . . , $p_k$].

Let's introduce the evaluation item set E=[$i_1$, . . . , $i_M$], comprising all items that can be found in the comparison from P. evaluation item set E may be ranked by following algorithm:

1. Initialize the ranking list E, e.g. randomly select the list as $E_0$=[$i_1$, . . . , $i_M$];

2. For epoch t, we go through each of evaluation pair $p_k$ of ranking list $E_t$.

For $k^{th}$ pair, $p_k$: $r_i$>$r_j$, if item i is ranked lower than item j, we swap the pair in the list, otherwise it is kept unchanged. The number of pair swap is counted as $C_t$ for a given epoch t.

3. Repeat epoch t+1, until $C_t$ cannot be reduced ($C_t$=0) at epoch T.

4. Output final ground truth ranking 115-GT: E=$E_T$

Thus, the pairwise comparison of parking difficulty includes setting a ground truth ranking $r_i$ larger than ground truth ranking $r_j$ of any location pair i, j, if the subjective parking difficulty of location i is ranked higher than of location j by the one or more users and generating a sorted list of ground truth rankings and corresponding locations.

If we have the ground truth rank as $p_k$: $r_i$=$r_j$, we can initially combine all same ranked items as item cluster and then treat them the same way as a single item and expand them after ranking. If there are conflicting ground truth ranking pairs, the one having the highest statistics may be used.

For the $i^{th}$ location, we can assume the ground truth rank to be $r_i$ and the model rank to be $\hat{r}_i$. A quality score for location the $i^{th}$ location may be expressed as $QS_i$=⌈$r_i$-$\hat{r}_i$⌉. Determining the prediction loss between the parking difficulty model ranking 115-M and the ground truth ranking 115-GT may include computing the prediction loss according to $$QS = |r_1 - \hat{r}_1| + \sum_{i=2}^{N} \frac{|r_1 - \hat{r}_1|}{\log_2(r_i)},$$

wherein $r_i$ denotes the ground truth ranking of the i-th location, $\hat{r}_i$ denotes a model ranking of the i-th location. The penalty can be different depending on the task and experiment.

Here, $1/\log_2(r_i)$ is merely used as an example to illustrate the principle of applying unequal weight for the loss.

Following Table 2 illustrates an experiment justifying the proposed approach from small but real-life data.

TABLE 2

| Destinations | Rank by Expert | Rank by Midian | W. Rank Diff | Rank by Mean | W. Rank Diff | Rank by Normalized Skewed Score | W. Rank Diff |
|---|---|---|---|---|---|---|---|
| Woodfield Mall | 5 | 6 | 0.43 | 6 | 0.43 | 6 | 0.43 |
| Old Town | 1 | 1 | 0.00 | 2 | 1.00 | 1 | 0.00 |

TABLE 2-continued

| Destinations | Rank by Expert | Rank by Midian | W. Rank Diff | Rank by Mean | W. Rank Diff | Rank by Normalized Skewed Score | W. Rank Diff |
|---|---|---|---|---|---|---|---|
| Navy Pier | 6 | 5 | 0.39 | 5 | 0.39 | 5 | 0.39 |
| Randolph Street | 2 | 3 | 1.00 | 3 | 1.00 | 2 | 0.00 |
| Arlington Hts | 3 | 4 | 0.63 | 1 | 1.26 | 4 | 0.63 |
| Schaumburg Costco | 4 | 2 | 1.00 | 4 | 0.00 | 3 | 0.50 |
| Weighted Quality Error |  |  | 0.50 |  | 0.68 |  | 0.32 |

In the illustrated example, the parking difficulty model ranking 115-M for the respective location is computed based on $$\text{Score} = \text{Median}^*(1 + \theta^* SK), \quad SK = \frac{\text{Median} - \text{Mean}}{\text{Var}},$$

wherein θ is the model parameter of the predictive parking difficulty model 100. For parking modeling s (feature|θ), we have $$\theta_{opt} = \underset{\theta}{\arg\min} \{QS(\theta)\}$$

Figure 3:
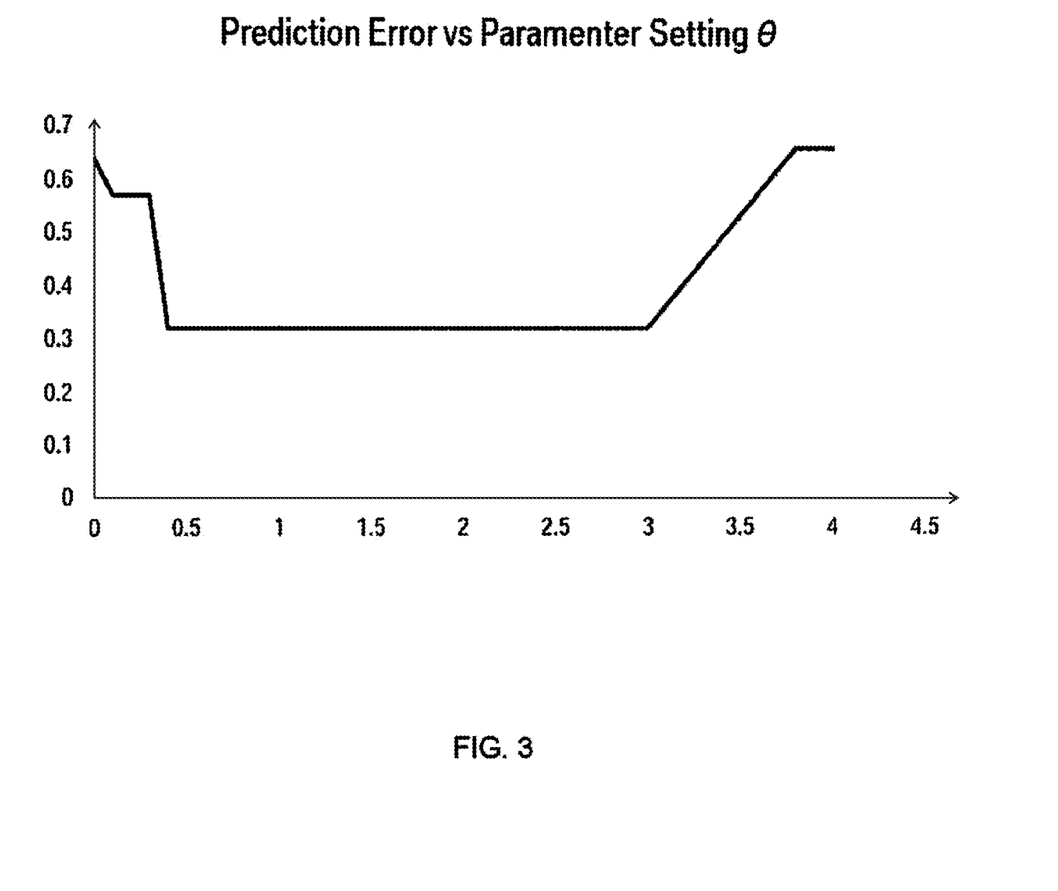
FIG. 3 illustrates an impact of model parameter setting on prediction error.

For the illustrated example of normalized skewed score: SK=(Median−Mean)/Var, Score=Median*(1+θ*SK), the parameter θ can be reliably estimated in the range of [0.5, 3] that is less sensitive for the objective (see FIG. 3). The trained predictive parking difficulty model 100 can then be applied to entire dataset I, rather than the evaluation/training dataset E.

The skilled person having benefit from the present disclosure will appreciate that the proposed search concept may be well suited for enhancing navigational systems in smartphones and/or cars. Therefore, according to a further aspect of the present disclosure, it is also provided a vehicle.

Figure 4:
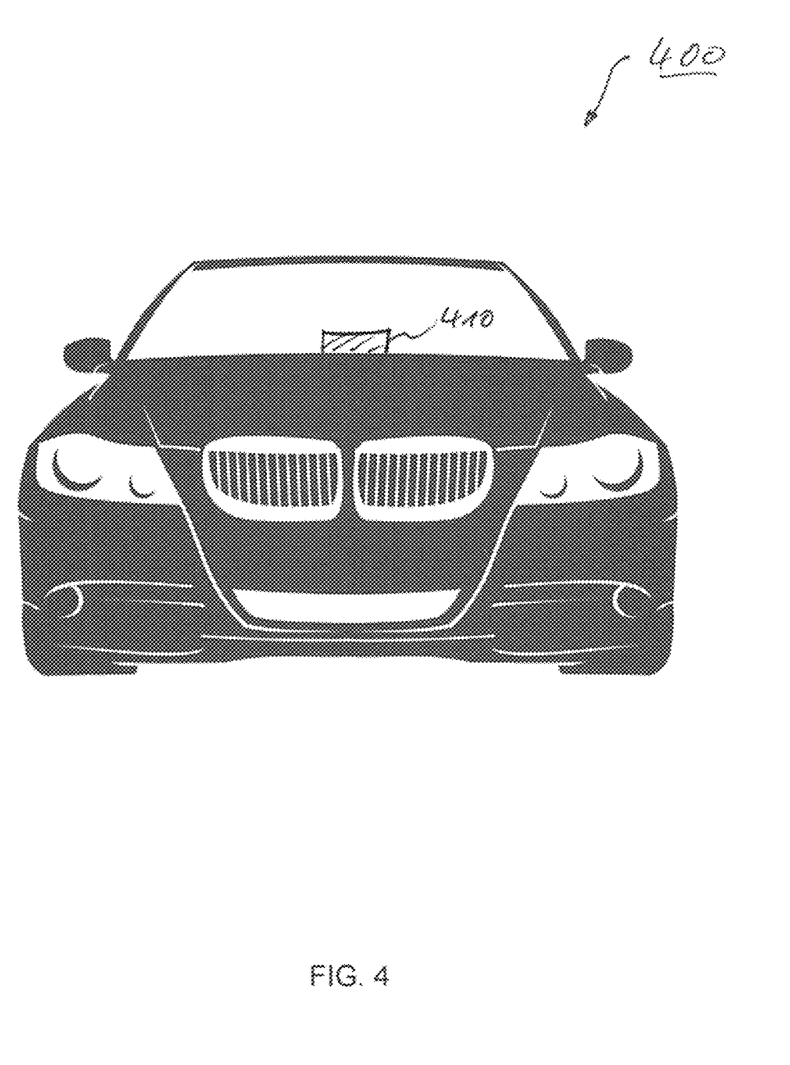
FIG. 4 illustrates car comprising an apparatus for optimizing one or more model parameters of a predictive parking difficulty model for different locations based on collected telemetry data in accordance with the present disclosure.

The vehicle 400 shown in FIG. 4 comprises an apparatus 410 for optimizing one or more model parameters of a predictive parking difficulty model for different locations based on collected telemetry data. The apparatus 410 comprises circuitry configured to determine a ground truth ranking related to a subjective parking difficulty at the different locations, wherein the circuitry is configured to determine the ground truth ranking based on a pairwise comparison of parking difficulty between pairs of the different locations done by one or more humans. The circuitry is further configured to determine a prediction loss between a model ranking of the different locations obtained by the predictive parking difficulty model and the ground truth ranking, and adjust the one or more model parameters to minimize the prediction loss between the model ranking and the ground truth ranking.

Figure 5:
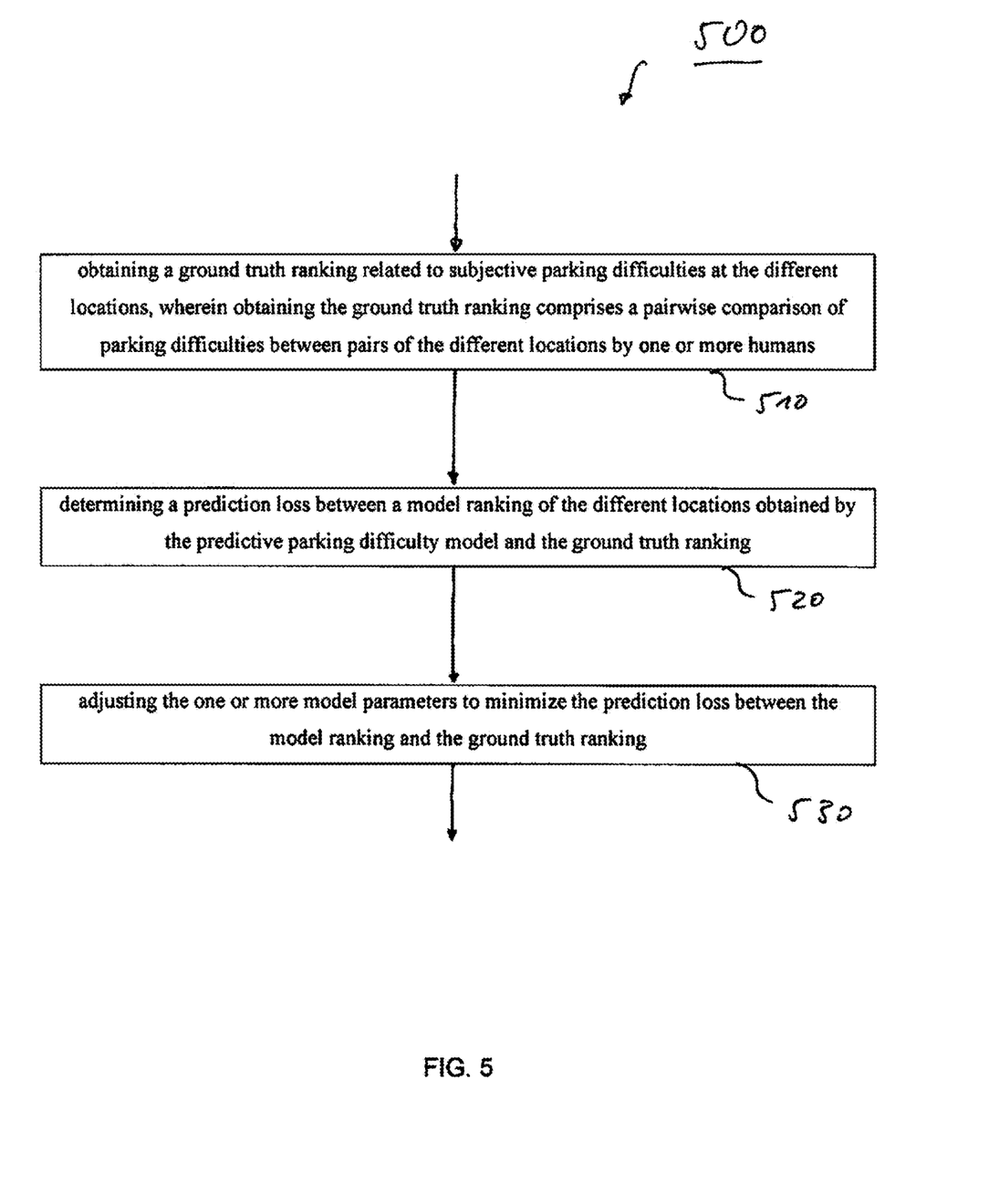
FIG. 5 shows a flowchart of a method of optimizing one or more model parameters of a predictive parking difficulty model for different locations based on collected telemetry data in accordance with the present disclosure.

To summarize, FIG. 5 illustrates a flowchart of a method 500 for training one or more model parameters of a predictive parking difficulty model 100 for different locations based on collected telemetry data.

Method 500 includes obtaining 510 a ground truth ranking related to subjective parking difficulties at the different locations, wherein obtaining the ground truth ranking comprises a pairwise comparison of parking difficulties between pairs of the different locations by one or more humans, determining 520 a prediction loss between a model ranking of the different locations obtained by the predictive parking difficulty model and the ground truth ranking, and adjusting 530 the one or more model parameters to minimize the prediction loss between the model ranking and the ground truth ranking.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

Embodiments may be based on using a machine-learning model or machine-learning algorithm. Machine learning may refer to algorithms and statistical models that computer systems may use to perform a specific task without using explicit instructions, instead relying on models and inference. For example, in machine-learning, instead of a rule-based transformation of data, a transformation of data may be used, that is inferred from an analysis of historical and/or training data. For example, the content of images may be analyzed using a machine-learning model or using a machine-learning algorithm. In order for the machine-learning model to analyze the content of an image, the machine-learning model may be trained using training images as input and training content information as output. By training the machine-learning model with a large number of training images and/or training sequences (e.g. words or sentences) and associated training content information (e.g. labels or annotations), the machine-learning model "learns" to recognize the content of the images, so the content of images that are not included in the training data can be recognized using the machine-learning model. The same principle may be used for other kinds of sensor data as well: By training a machine-learning model using training sensor data and a desired output, the machine-learning model "learns" a transformation between the sensor data and the output, which can be used to provide an output based on non-training sensor data provided to the machine-learning model. The provided data (e.g. sensor data, meta data and/or image data) may be preprocessed to obtain a feature vector, which is used as input to the machine-learning model.

Machine-learning models may be trained using training input data. The examples specified above use a training method called "supervised learning". In supervised learning, the machine-learning model is trained using a plurality of training samples, wherein each sample may comprise a plurality of input data values, and a plurality of desired output values, i.e. each training sample is associated with a desired output value. By specifying both training samples and desired output values, the machine-learning model "learns" which output value to provide based on an input sample that is similar to the samples provided during the training. Apart from supervised learning, semi-supervised learning may be used. In semi-supervised learning, some of the training samples lack a corresponding desired output value. Supervised learning may be based on a supervised learning algorithm (e.g. a classification algorithm, a regression algorithm or a similarity learning algorithm. Classification algorithms may be used when the outputs are restricted to a limited set of values (categorical variables), i.e. the input is classified to one of the limited set of values. Regression algorithms may be used when the outputs may have any numerical value (within a range). Similarity learning algorithms may be similar to both classification and regression algorithms but are based on learning from examples using a similarity function that measures how similar or related two objects are. Apart from supervised or semi-supervised learning, unsupervised learning may be used to train the machine-learning model. In unsupervised learning, (only) input data might be supplied, and an unsupervised learning algorithm may be used to find structure in the input data (e.g. by grouping or clustering the input data, finding commonalities in the data). Clustering is the assignment of input data comprising a plurality of input values into subsets (clusters) so that input values within the same cluster are similar according to one or more (pre-defined) similarity criteria, while being dissimilar to input values that are included in other clusters.

Reinforcement learning is a third group of machine-learning algorithms. In other words, reinforcement learning may be used to train the machine-learning model. In reinforcement learning, one or more software actors (called "software agents") are trained to take actions in an environment. Based on the taken actions, a reward is calculated. Reinforcement learning is based on training the one or more software agents to choose the actions such, that the cumulative reward is increased, leading to software agents that become better at the task they are given (as evidenced by increasing rewards).

Furthermore, some techniques may be applied to some of the machine-learning algorithms. For example, feature learning may be used. In other words, the machine-learning model may at least partially be trained using feature learning, and/or the machine-learning algorithm may comprise a feature learning component. Feature learning algorithms, which may be called representation learning algorithms, may preserve the information in their input but also transform it in a way that makes it useful, often as a pre-processing step before performing classification or predictions. Feature learning may be based on principal components analysis or cluster analysis, for example.

In some examples, anomaly detection (i.e. outlier detection) may be used, which is aimed at providing an identification of input values that raise suspicions by differing significantly from the majority of input or training data. In other words, the machine-learning model may at least partially be trained using anomaly detection, and/or the machine-learning algorithm may comprise an anomaly detection component.

In some examples, the machine-learning algorithm may use a decision tree as a predictive model. In other words, the machine-learning model may be based on a decision tree. In a decision tree, observations about an item (e.g. a set of input values) may be represented by the branches of the decision tree, and an output value corresponding to the item may be represented by the leaves of the decision tree. Decision trees may support both discrete values and continuous values as output values. If discrete values are used, the decision tree may be denoted a classification tree, if continuous values are used, the decision tree may be denoted a regression tree.

Association rules are a further technique that may be used in machine-learning algorithms. In other words, the machine-learning model may be based on one or more association rules. Association rules are created by identifying relationships between variables in large amounts of data. The machine-learning algorithm may identify and/or utilize one or more relational rules that represent the knowledge that is derived from the data. The rules may e.g. be used to store, manipulate or apply the knowledge.

Machine-learning algorithms are usually based on a machine-learning model. In other words, the term "machine-learning algorithm" may denote a set of instructions that may be used to create, train or use a machine-learning model. The term "machine-learning model" may denote a data structure and/or set of rules that represents the learned knowledge (e.g. based on the training performed by the machine-learning algorithm). In embodiments, the usage of a machine-learning algorithm may imply the usage of an underlying machine-learning model (or of a plurality of underlying machine-learning models). The usage of a machine-learning model may imply that the machine-learning model and/or the data structure/set of rules that is the machine-learning model is trained by a machine-learning algorithm.

For example, the machine-learning model may be an artificial neural network (ANN). ANNs are systems that are inspired by biological neural networks, such as can be found in a retina or a brain. ANNs comprise a plurality of interconnected nodes and a plurality of connections, so-called edges, between the nodes. There are usually three types of nodes, input nodes that receiving input values, hidden nodes that are (only) connected to other nodes, and output nodes that provide output values. Each node may represent an artificial neuron. Each edge may transmit information, from one node to another. The output of a node may be defined as a (non-linear) function of its inputs (e.g. of the sum of its inputs). The inputs of a node may be used in the function based on a "weight" of the edge or of the node that provides the input. The weight of nodes and/or of edges may be adjusted in the learning process. In other words, the training of an artificial neural network may comprise adjusting the weights of the nodes and/or edges of the artificial neural network, i.e. to achieve a desired output for a given input.

Alternatively, the machine-learning model may be a support vector machine, a random forest model or a gradient boosting model. Support vector machines (i.e. support vector networks) are supervised learning models with associated learning algorithms that may be used to analyze data (e.g. in classification or regression analysis). Support vector machines may be trained by providing an input with a plurality of training input values that belong to one of two categories. The support vector machine may be trained to assign a new input value to one of the two categories. Alternatively, the machine-learning model may be a Bayesian network, which is a probabilistic directed acyclic graphical model. A Bayesian network may represent a set of random variables and their conditional dependencies using a directed acyclic graph. Alternatively, the machine-learning model may be based on a genetic algorithm, which is a search algorithm and heuristic technique that mimics the process of natural selection.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

The invention claimed is:

1. Method for training one or more model parameters of a predictive parking difficulty model for different locations based on collected telemetry data, the method comprising:
   obtaining a ground truth ranking related to subjective parking difficulties at the different locations, wherein obtaining the ground truth ranking comprises a pairwise comparison of parking difficulties between pairs of the different locations by one or more humans;
   collecting, from a plurality of users, the telemetry data for each of the different locations;
   converting respective telemetry data for the different locations to a respective model ranking indicating a respective location's parking difficulty;
   determining a prediction loss between the model ranking of parking difficulties at the different locations obtained by the predictive parking difficulty model and the ground truth ranking;
   adjusting the one or more model parameters of the predictive parking difficulty model to minimize the prediction loss between the model ranking and the ground truth ranking; and
   using the predictive parking difficulty model implemented in a navigation system with the adjusted model parameters for predicting a parking difficulty at a potential target location,
   wherein converting the telemetry data to the model ranking for a respective location is based on a median, a mean, and a variance of the telemetry data for the respective location across all users, and based on the one or more model parameters of the predictive parking difficulty model,
   wherein the model ranking for the respective location is computed based on $$\text{Score} = \text{Median}^*(1 + \theta^* SK), SK = \frac{\text{Median} - \text{Mean}}{\text{Var}},$$

wherein θ is a model parameter of the predictive parking difficulty model.

2. The method of claim 1, wherein determining the prediction loss comprises weighting locations with higher parking difficulty more than locations with lower parking difficulty.

3. The method of claim 1, wherein determining the prediction loss comprises computing the prediction loss according to $$QS = |r_1 - \hat{r}_1| + \sum_{i=2}^{N} \frac{|r_1 - \hat{r}_1|}{\log_2(r_i)},$$

wherein $r_i$ denotes a ground truth ranking of the i-th location, and $\hat{r}_i$ denotes a model ranking of the i-th location, and $r_1$ and $\hat{r}_1$ are $r_i$ and $\hat{r}_i$ with i=1, respectively.

4. The method of claim 1, wherein collecting the telemetry data for each of the different locations comprises measuring a user's walking distance from a parking location to a final destination.

5. The method of claim 1, further comprising generating a sorted list of model rankings and corresponding locations.

6. The method of claim 1, wherein the predictive parking difficulty model is implemented by a machine learning model mapping one or more features extracted from the collected telemetry data to the model ranking of the for different locations.

7. The method of claim 1, wherein the pairwise comparison of parking difficulties comprises setting ground truth ranking $r_i$ larger than ground truth ranking $r_j$ of any location pair i, j, if the subjective parking difficulty of location i is ranked higher than that of location j by one or more users and generating a sorted list of ground truth rankings and corresponding locations.

8. Apparatus for optimizing one or more model parameters of a predictive parking difficulty model for different locations based on collected telemetry data, the apparatus comprising circuitry configured to:
   determine a ground truth ranking related to a subjective parking difficulty at the different locations, wherein the circuitry is configured to determine the ground truth ranking based on a pairwise comparison of parking difficulty between pairs of the different locations done by one or more humans;

collect, from a plurality of users, the telemetry data for each of the different locations;

convert respective telemetry data for the different locations to a respective model ranking indicating a respective location's parking difficulty;

determine a prediction loss between the model ranking of parking difficulties at the different locations obtained by the predictive parking difficulty model and the ground truth ranking;

adjust the one or more model parameters to minimize the prediction loss between the model ranking and the ground truth ranking; and use the predictive parking difficulty model implemented in a navigation system with the adjusted model parameters for predicting a parking difficulty at a potential target location, wherein converting the telemetry data to the model ranking for a respective location is based on a median, a mean, and a variance of the telemetry data for the respective location across all users, and based on the one or more model parameters of the predictive parking difficulty model, wherein the model ranking for the respective location is computed based on $$\text{Score} = \text{Median} * (1 + \theta * SK), \; SK = \frac{\text{Median} - \text{Mean}}{\text{Var}}.$$

wherein $\theta$ is a model parameter of the predictive parking difficulty model.

* * * * *